Oct. 8, 1935.                    E. S. COOK                         2,016,411
                            FLUID PRESSURE BRAKE
                            Filed June 24, 1933           2 Sheets-Sheet 1
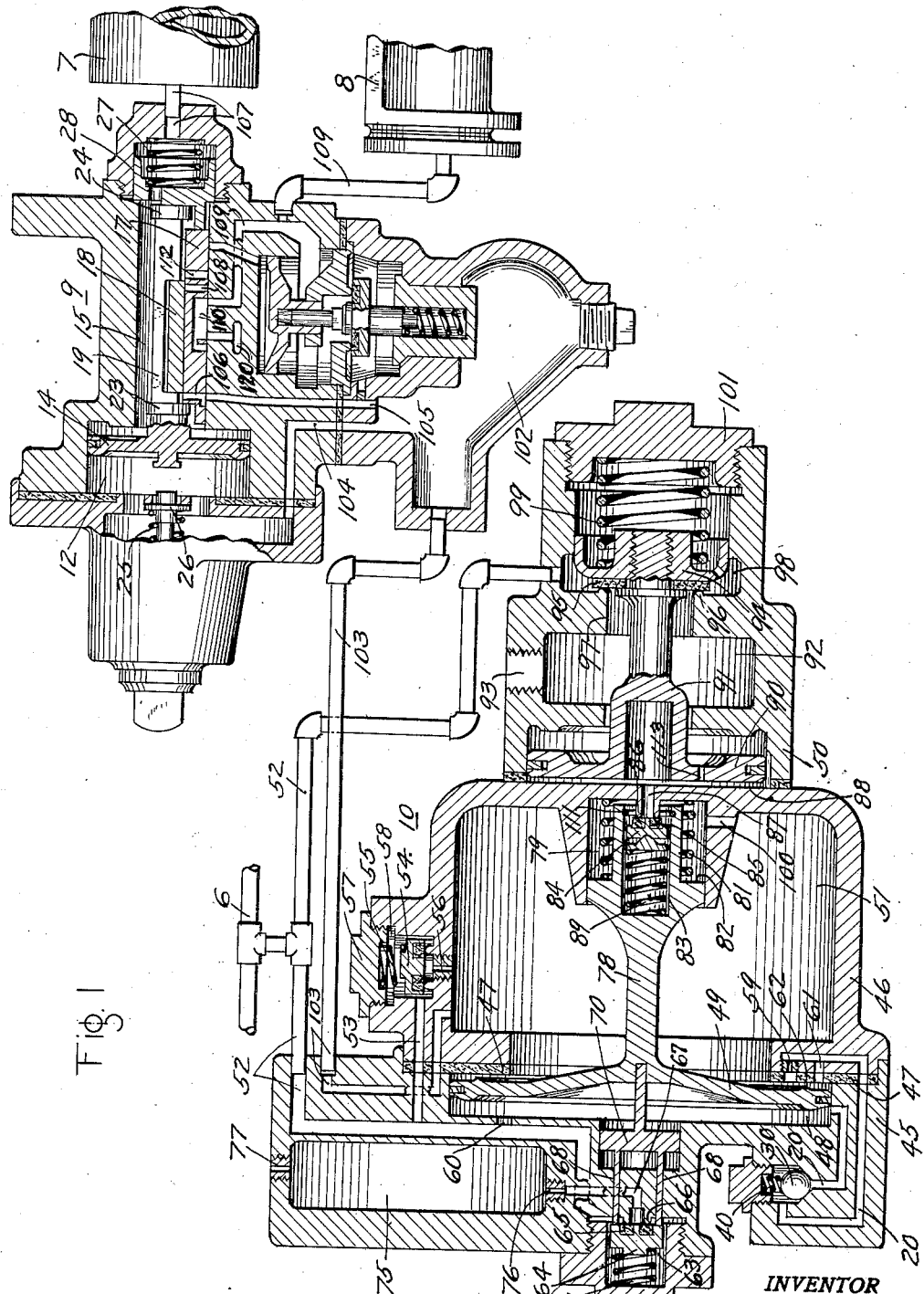
INVENTOR
EARLE S. COOK
BY
Wm. H. Cady
ATTORNEY Oct. 8, 1935.   E. S. COOK   2,016,411
FLUID PRESSURE BRAKE
Filed June 24, 1933   2 Sheets-Sheet 2
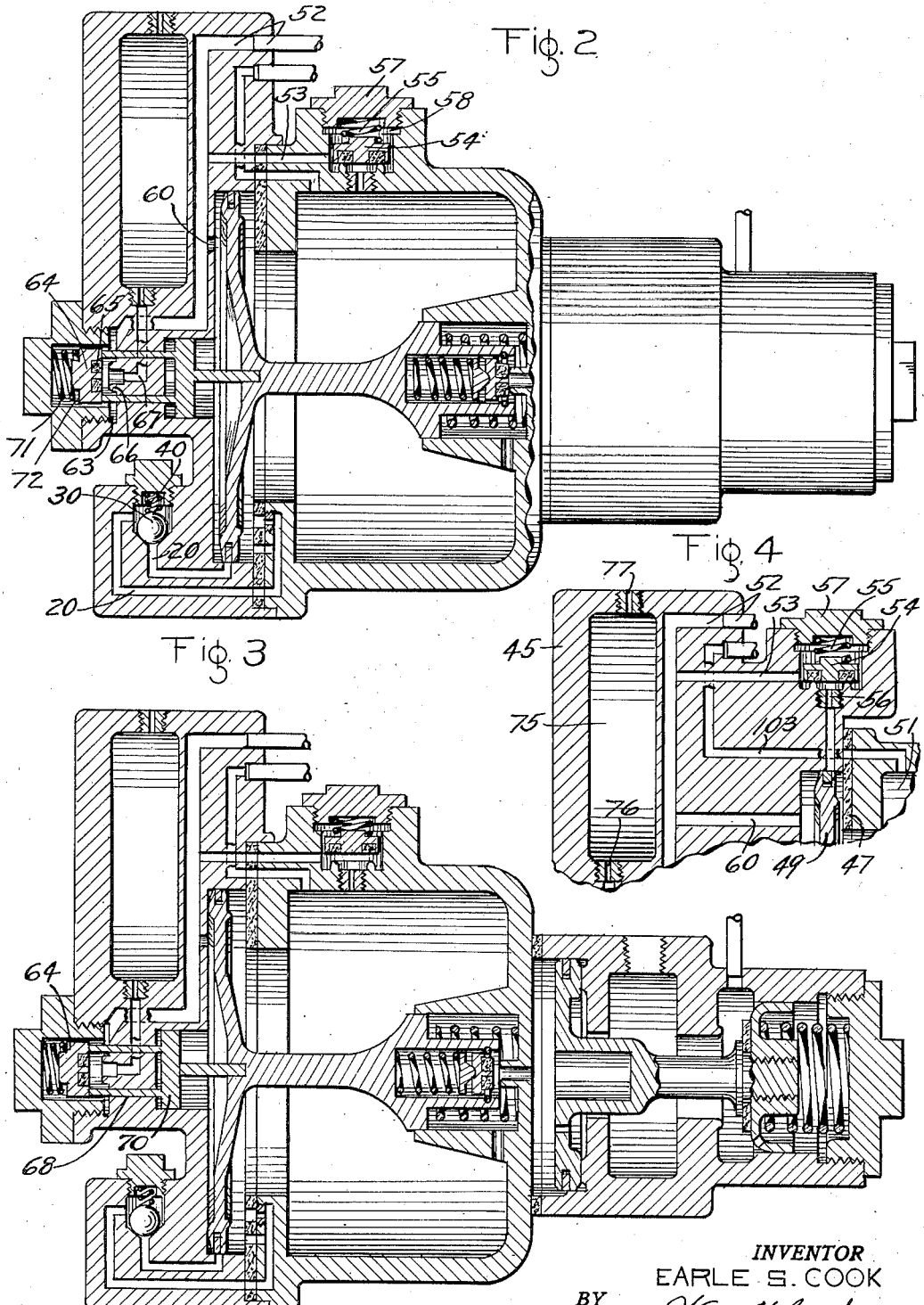
INVENTOR
EARLE S. COOK
BY
Wm. M. Cady
ATTORNEY Patented Oct. 8, 1935

2,016,411

UNITED STATES PATENT OFFICE 2,016,411

FLUID PRESSURE BRAKE

Earle S. Cook, Wilkinsburg, Pa., assignor to The Westinghouse Air Brake Company, Wilmerding, Pa., a corporation of Pennsylvania Application June 24, 1933, Serial No. 677,438

14 Claims. (Cl. 303—83)

This invention relates to fluid pressure brakes and particularly to apparatus for controlling the operation of the triple valve devices or other brake controlling valve devices for facilitating the application and release of the brakes on a train of cars. It is well known that the brake controlling valve devices commonly known as triple valve devices employed for controlling the application and release of the brakes on a train of cars require a definite reduction in brake pipe pressure to overcome the friction of the main valves in order to effect movement of the triple valve pistons to positions for effecting a service or emergency application of the brakes, and that the rate of brake pipe pressure reduction for effecting a service application of the brakes is limited to a predetermined rate commonly known as a service rate, in order to obtain movement of the triple valve pistons to service position and so that said pistons will not move to emergency position when a service application of the brakes is desired. Reduction of brake pipe pressure at a rate faster than service rate or at an emergency rate, causes movement of the triple valve pistons and the slide valves to emergency position, wherein an emergency application of the brakes is effected.

The triple valve device commonly known as the K-triple valve device requires from two to two and one-half pounds brake pipe pressure reduction below that in the auxiliary reservoir (which has been charged to brake pipe pressure), in order to overcome inertia and frictional resistance and to effect movement of the triple valve piston to service position, and a greater reduction in brake pipe pressure to overcome the opposing resistance of a stop spring to effect movement of the piston to emergency position, and it has been found that an appreciable time is required to cause such pressure reduction on the rear cars of the train, even though the triple valve device is equipped with the commonly employed quick service and quick action valve devices for locally and progressively venting fluid from the brake pipe when the triple valve device is moved to service or emergency position.

Consequently, in making a service application of the brakes on a long train, there is an undesirable lapse of time between the application of the brakes on the cars at the head end of the train and the application of the brakes on the cars at the rear end of the train.

This is also true and is particularly undesirable in making an emergency application of the brakes, for in such case, the slack of the train may run in with undue harshness due to the sudden retardation of the cars at the head end of the train as a result of the hard application of the brakes on the front cars of the train before the brakes on the rear cars are applied.

It is an object of this invention to provide an accelerator valve device on each car for use in conjunction with a standard K-triple valve device or any triple or brake controlling valve device not provided with quick service or emergency quick action means and which is more sensitive to fluid pressure variations than the K-triple valve device and which operates upon a relatively slight reduction in brake pipe pressure to effect a local reduction in brake pipe pressure for propagating through the medium of similar sensitive accelerator valve devices on the cars of the train, serial local brake pipe pressure reduction on successive cars throughout the length of the train, and to thereby increase the rate at which the brakes are successively applied on the cars of the train from front to rear.

Another object of the invention is to provide an accelerator valve device having the above noted characteristics wherein the travel of the fluid pressure sensitive piston for operating the valve for effecting local brake pipe pressure reduction is relatively short so that dampening action due to piston displacement is minimized and does not appreciably interfere with quick service and quick action pressure reduction in transmission.

A further object of the invention is to provide an accelerator valve device for use in conjunction with triple valve devices, wherein means are provided for permitting the fluid pressure acting on opposite faces of the triple valve piston to substantially equalize, in the event of an overcharged brake pipe, and thereby prevent an undesired application of the brakes when the brake pipe pressure falls to the lower pressure maintained by the feed valve as when the brake valve, not shown, is moved from charging or release position to running position, and insuring a more consistent response of the triple valve devices to effect an application of the brakes upon a reduction in brake pipe pressure closely following a release operation of the brakes.

A further object of the invention is to provide an accelerator valve device having the above noted characteristics whereby release of the brakes is accelerated from the front to the rear of the train and with more uniform release action.

A further object of the invention is to provide an accelerator valve device for the purposes defined which may be associated with a standard K-triple valve device without necessitating material structural alteration thereof, and which is relatively simple and of inexpensive and rugged construction.

A further object of the invention is to provide an accelerator valve device having the general characteristics of the accelerator valve mechanism disclosed in the co-pending application of Earle S. Cook, the applicant herein, and Ellery R. Fitch, Serial No. 677,436, filed concurrently herewith and assigned to the assignee of this application, and wherein the valve mechanism for effecting pressure reduction waves at an emergency rate for effecting an emergency application of the brakes is actuated by fluid pressure controlled by a quick service piston device.

These and other objects of the invention that will be made apparent throughout the further description thereof are attained by means of the accelerator valve device hereinafter described and illustrated in the accompanying drawings, wherein:

Fig. 1 is a sectional view, partially in elevation, of the improved accelerator valve device connected to fluid pressure brake equipment including a triple valve device and showing the parts in release position;

Fig. 2 is a sectional view, partially in elevation, of the accelerator valve device shown in Fig. 1 with the parts in service application position;

Fig. 3 is a sectional view of the accelerator valve device shown in Fig. 1 with the parts in emergency application position; and Fig. 4 is a fragmental sectional view of a modified form of accelerator valve device.

Referring to the drawings, the equipment includes a brake pipe 6, an auxiliary reservoir 7, a brake cylinder 8, a triple valve device 9, and an accelerator valve device 10, all of which equipment is carried on each car of a train of cars.

The triple valve device 9 may comprise a casing having a piston chamber 12 containing a piston 14 and having a valve chamber 15 connected to the auxiliary reservoir 7 and containing a main slide valve 17 and an auxiliary or graduating slide valve 18, mounted on and having a movement relative to the main slide valve, said valve being operated by said piston through a piston stem 19. The main slide valve 17 is disposed between a stop shoulder 23 on the stem 19 and a stop flange 24 on the end of the stem, and the shoulders 23 and 24 are so spaced that the stem may be moved within certain limits of movement without effecting movement of the main slide valve 17. The graduating valve 18 is so connected to the stem 19 that it moves with the stem and may lap and uncover ports in the main slide valve, as will hereinafter appear.

A stop spring 25, which yieldingly engages a stop member 26, serves to yieldingly arrest the piston 14 in lap position, wherein the piston just engages the stop member 26 and is adapted to be compressed and permit movement of the piston 14 to service application position or to its extreme left or emergency application position upon reduction of the fluid pressure within the chamber 12, at an emergency rate. A stop spring 27 acting on a stop member 28 serves to yieldingly arrest the piston 14 in normal or full release position (shown in Fig. 1) when the piston is moved to the right from an application position.

The triple valve device shown, being of the well known K type, is provided with means for effecting quick service action and emergency quick action, but when the improved means for securing quick serial service action and emergency quick action is employed, the passages through which quick service and emergency quick action are effected are plugged, so that these features of the K triple valve device are rendered inoperative.

The accelerator valve device 10 may comprise casing sections 45 and 46 that are secured together by means of bolts, not shown, and with a sealing gasket 47 therebetween. A piston chamber 48 is disposed within the casing 45 and contains an accelerator piston 49 having at one side an accelerator chamber 51 formed in the casing 46.

The piston chamber 48 is connected to the brake pipe 6 by means of passage and pipe 52 and a port 60, the passage and port being relatively short and having a flow capacity equal to that of the brake pipe. The accelerator chamber 51 is connected to the brake pipe 6 through a passage 53 containing a breather choke plug having a restricted passage 56 and containing a check valve 54 that is preferably loaded by means of a relatively lightly tensioned spring 55. The spring 55 which presses the check valve 54 into engagement with its seat, is retained by means of a threaded nut 57, which closes the check valve chamber 58. In order to vary the spring pressure applied to the valve, a spring having a different tension value may be substituted. The choke passage 56 functions, in part, as hereinafter described, to effect stabilization of piston 49, on a rate basis, against undesired emergency operation.

Communication from the piston chamber 48 to the accelerator chamber 51 is established through a passage 20 containing a ball check valve 30 and passages 59 and 61 in the casing 46, the latter being disposed exteriorly of an annular seat rib 62 on the piston 49, which is adapted to make sealing engagement with the sealing gasket 47 under certain charging conditions. The ball check valve 30 is normally yieldingly retained in seated position by a loading spring 40.

The casing 45 contains a quick service valve chamber 63 that is open to the brake pipe through passage 52 and which contains a quick service valve 64 having a sealing seat 65 adapted to engage an annular seat rib 66 and normaly close a passage 67, which is connected to a quick service bulb 75 through a restricted passage 76. The bulb is open to the atmosphere through a restricted passage 77. The valve 64 is adapted to be moved to open position against the action of the spring 71 and the pressure of fluid at brake pipe pressure, by a stem member 70 that is fixed to the piston 49 and which extends through openings 68 in a wall of the casing 45 and into engagement with the inner face of the valve 64, when the quick service piston 49 is moved toward service application position. The piston 49 is stabilized, on a pressure differential basis, against undesired quick service operation thereof caused by fluctuations in brake pipe pressure incident to normal feed valve operation, by the unbalanced fluid pressure acting on valve 64 and by the tension of the spring 71 resisting opening movement of valve 64.

The piston 49 is provided with a tail piece or guide stem 78 which extends into a chamber 79 containing a spring 81 which is disposed between the wall of the casing 46 and a shoulder 82 on the stem 78 and which cooperates with the quick service valve spring 71 in centering the quick service piston 49 in the release position shown in Fig. 1.

The stem 78 is provided with a valve chamber 83 containing valve 84 having a sealing seat 85 that is adapted to engage an annular seat rib 86 surrounding an opening or passage 87 leading to a quick action piston chamber 88 in the casing 50. A spring 89 within the chamber 83 serves to yieldingly retain the valve 84 seated upon the seat rib 86.

In operation, when initially charging, the brake valve device, not shown, is placed in release position, in which fluid under pressure is supplied from the main reservoir to the brake pipe in the usual well known manner, and after a certain interval the brake valve device is moved to running position, in which the pressure of the fluid supplied to the brake pipe is governed by the feed valve device, not shown.

Assuming that the parts of the accelerator valve device are in the lap or release position to which they are moved when the pressure on opposite faces of the accelerator piston are balanced, and that the triple valve parts are in the normal release position, as shown in Fig. 1, fluid under pressure flows from the brake pipe to the accelerator chamber 51 through pipe and passage 52, port 60, piston chamber 48, passage 20, past ball check valve 30 and the passages 59 and 61 in the casing 46. With the triple valve parts in the normal release position, as shown in Fig. 1, wherein the brake cylinder 8 is open to the atmosphere by way of pipe and passage 109, cavity 110 in the main valve 17, and atmospheric passage 120, fluid under pressure flows from the accelerator chamber 51 to the triple valve piston chamber 12 through passage and pipe 103, dirt collector chamber 102 and passage 104.

With the main slide valve 17 of the triple valve device in normal release position, fluid under pressure flows from the dirt collector chamber 102 to the auxiliary reservoir 7 through passage 105, port 106 in the main slide valve 17, valve chamber 15, and passage and pipe 107.

It is well known that when the brake pipe is charged from the main reservoir at the head end of the train, the brake pipe pressure is higher at the head end of the train than it is at the rear end of the train, and that there is a tendency to overcharge the auxiliary reservoirs at the head end of the train before the auxiliary reservoirs at the rear end of the train are fully charged, and that where no means is provided to prevent rapid charge of the auxiliary reservoirs at the head end of the train, the length of time required to supply sufficient fluid under pressure to the auxiliary reservoirs and to cause release of the brakes on the rear cars of the train is increased.

To overcome this difficulty, provision is made for supplying fluid from the brake pipe to the triple valve piston chambers and auxiliary reservoirs on the cars at the head end of the train for effecting release of the brakes and charging of the reservoirs, at a slower rate than the rate at which fluid is supplied to the triple valve piston chambers and the auxiliary reservoirs on the cars at the rear end of the train. When the brake valve device, not shown, is moved to release position, fluid under pressure is supplied from the main reservoir to the brake pipe, in the usual manner. Fluid under pressure is thus supplied to the piston chambers 48 on the cars at the head end of the train at a faster rate than fluid can flow through the ports 59 and 61 to the accelerator chamber 51. Consequently the pressure of the fluid in said piston chambers 48 builds up faster than the pressure builds up in the accelerator chamber 51 and when sufficient pressure differential has built up to overcome the tension of the springs 81 and 89, the accelerator piston 49 is moved to the right into sealing position wherein the sealing rib 62 engages the gasket 47 and closes communication from the brake pipe to the accelerator chamber 51 through port 61. With the piston 49 in sealing position, fluid under pressure can no longer flow from the piston chamber 48 to the accelerator chamber 51 through the port or passage 61, and thereafter the accelerator chamber 51 is charged at a slower rate through the restricted port 59, thereby limiting the rate of flow of fluid from the brake pipe to the accelerator chambers on cars at the head end of the train. On cars at the rear end of the train, the brake pipe pressure is lower than on cars at the head end of the train and consequently insufficient pressure differential is built up on opposite sides of the piston 49 to overcome the tension of the springs 81 and 89. The pistons 49 on the cars at the rear end of the train therefore remain in normal position, shown in Fig. 1, and consequently fluid under pressure may flow to the accelerator chambers 51 on the rear cars of the train, through the passages 59 and 61. In this manner the auxiliary reservoirs at the head end of the train are supplied with fluid at a slower rate than would ordinarily be the case, thus conserving the fluid under pressure supplied to the brake pipe for delivery to the triple valve devices and auxiliary reservoirs on the cars at the rear end of the train, and effecting more uniform release of the brakes in a shorter time and more uniform charging of the auxiliary reservoirs.

It will be understood that fluid under pressure supplied to the accelerator chambers 51 on the cars at the head end of the train, from the brake pipe 6 through the port 59, flows through the passage and pipe 103, dirt collector chamber 102 and passage 104 to the triple valve piston chamber 12 at a rate sufficient to cause sufficient pressure differential on opposite sides of the triple valve pistons 14 to move them to normal release position shown in Fig. 1.

In the event of an overcharged brake pipe, such as might cause the pressure of the fluid within the accelerator chamber and the triple valve piston chamber 12 to exceed the pressure in the auxiliary reservoir and the valve chamber 15, the pressures on opposite faces of the piston 14 are caused to rapidly equalize through the passages 104 and 105 connected through the dirt collector chamber 102. This provision insures more consistent response of the triple valve piston to a brake pipe pressure reduction for effecting an application of the brakes closely following a release of the brakes, as a result of an increase in brake pipe pressure. When the equipment is thus charged and the brakes are released, a reduction in brake pipe pressure will effect an application of the brakes in a manner to be hereinafter described.

Assuming the brake equipment to be in fully charged condition and the parts of the equipment to be in release position shown in Fig. 1, in order to effect a service application of the brakes, the brake valve device, not shown, is moved to application position where it is held until the desired reduction in brake pipe pressure at a service rate has been effected. The reduction in brake pipe pressure at the head end of the train effects reduction of the pressure of the fluid in the piston chambers 48 of the accelerator valve devices on the cars at the head end of the train.

Reduction of fluid pressure in the chamber 48 causes the higher pressure in chamber 51 acting on the right face of the piston 49 to move it to the left to service position shown in Fig. 2. The present device is so constructed that the piston will move toward service position as soon as there is built up a differential pressure of a quarter of a pound in the chamber 51. The piston 49 is stabilized against undesired quick service operation as previously explained. As the piston 49 thus moves, the stem 70 unseats the valve 64 against the opposing pressure of the spring 71. When the valve 64 is thus unseated, fluid is vented from the piston chamber 48 to the quick service bulb 75 through port 60, passage 52, chamber 63, the open valve 64 and restricted passage 76, the flow area of said restricted passage being such as to permit a rapid venting of fluid under pressure from the piston chamber 48 into the quick service bulb 75. Since the brake pipe is in communication with piston chamber 48 through the pipe and passage 52, the venting of piston chamber 48 causes a local venting of fluid from the brake pipe and this venting is effected serially on the cars of the train from front to rear.

The spring 55 acting on the check valve 54 is of such value that it retains the check valve 54 seated until a differential pressure acting thereon is slightly greater than that required to move the accelerator piston 49. Therefore if the brake pipe pressure reduction is continued after the piston 49 moves to service position so as to increase the pressure differential acting on the check valve 54, the higher pressure acting on the seated face of the check valve causes it to open.

With the check valve 54 open, fluid under pressure is vented from the accelerator chamber to the brake pipe at a service rate through the restricted passage 56 and thereby causes reduction in pressure in the piston chamber 12 of the triple valve device at a corresponding or service rate.

The piston 49 is stabilized, on a basis of rate of change in pressure, against undesired movement thereof to emergency position by the restricted passage 56 which functions when the check valve 54 opens due to unbalance of fluid pressure thereon to necessitate the reduction of brake pipe pressure at a rate sufficiently faster than the rate of reduction for service application of the brakes so that a sufficient differential of fluid pressures must be effective on the piston 49 to overcome the tension of spring 71 and fluid pressure acting to prevent opening movement of valve 84, as explained later in connection with a typical emergency operation.

When the brake pipe pressure in the triple valve piston chamber 12 is reduced by the aforementioned local venting of brake pipe pressure sufficiently below the auxiliary reservoir pressure in the valve chamber 15, that the differential created on the piston 14 is great enough to overcome the resistance offered by the piston and main slide valve 17 in addition to the resistance of the graduating spring 25, the piston will move toward the left to full service position, carrying the slide valve 17 with it to service application position. With the triple valve piston 14 in service application position, fluid under pressure flows from the auxiliary reservoir 7 to the brake cylinder 8 through pipe and passage 107, valve chamber 15, service port 108 in the main slide valve 17 and passage and pipe 109.

As the main slide valve 17 moves from release position toward service application position, communication from the accelerator chamber 51 to the triple valve chamber 15 through passage and pipe 103, dirt collector chamber 102, and passage 105 is cut off at the seat of the main slide valve.

The initial reduction in fluid pressure in the accelerator piston chamber 48 caused by opening of the valve 64 and the establishing of communication between the piston chamber 48 and the bulb 75 in the manner described, causes, as previously described, a local reduction in brake pipe pressure at the head cars of the train, which is transmitted to the quick service equipment on the succeeding cars, thereby serially propagating local quick service action throughout the train for rapidly effecting serial service applications of the brakes on the cars throughout the length of the train.

At the conclusion of the brake pipe pressure reduction for effecting a service application of the brakes, the fluid pressure within the piston chamber 48 and the chamber 51 acting on opposite faces of the quick service piston 49 equalizes through ports 59 and 61, thereby permitting the spring 71 acting on the valve 64 to move the valve 64 to lap or closed position and also to move the accelerator piston 49 to the normal release position shown in Fig. 1.

When the desired reduction in brake pipe pressure has been effected and the brake valve device, not shown, is turned to lap position in the usual manner, the triple valve device operates to supply fluid from the auxiliary reservoir to the brake cylinder until the pressure in the auxiliary reservoir has been reduced to a degree slightly less than the reduced pressure in the accelerator chamber, at which time, the triple valve piston 14 is moved by the spring 25 so as to shift the graduating valve 18 to lap position.

With the main and graduating slide valves in lap position, the service port 108 is lapped by the graduating valve and communication from the auxiliary reservoir to the brake cylinder is therefore closed so that no further fluid is supplied to the brake cylinder and fluid under pressure is retained therein in the well known manner.

With the quick service piston 49 in the normal position shown in Fig. 1, the valve 64 is closed and the fluid under pressure within the quick service bulb 75 flows to atmosphere at a rate as permitted by the restricted passage 77 so that the pressure in the quick service bulb 75 is reduced to provide for further reduction in brake pipe pressure when the accelerator piston again opens the communication from the brake pipe to the bulb past the valve 64.

Should it be desired to increase the force with which the brakes are applied, a further reduction in brake pipe pressure is effected by moving the brake valve device, not shown, to service application position. In this event the operation of the accelerator piston and the triple valve piston as above described is repeated and may be repeated as desired. The flow capacity of the restricted port 77 may be such that the quick service bulb will not be completely vented between successive operations of the piston 49. In this event the succeeding local reductions in brake pipe pressure will be less in degree than the initial local reduction, it being desirable to provide a slightly heavier initial reduction in order to compensate for the displacement of the brake cylinder piston.

In the Patent 1,974,954 of Ellery R. Fitch and the applicant, assigned to the assignee of this application, a brake apparatus is disclosed for securing what is termed a "rippler quick service" in which the cars of the train are equipped with a quick service vent valve device which responds quickly to a light reduction in brake pipe pressure and the locomotive with means for effecting light successive reductions in brake pipe pressure, so long as the brake valve device is held in service application position. If the present construction is to be employed in connection with such apparatus, then the volume of the quick service bulb should be made small.

To effect release of the brakes, the brake valve device, not shown, is moved to release position wherein fluid is supplied from the main reservoir to the brake pipe, thereby so increasing the brake pipe pressure that the accelerator pistons 49 on the cars at the head end of the train where the brake pipe pressure is high, are moved to sealing position in the manner previously described. When the pressure in the accelerator chamber 51 and the triple valve piston chamber 12 builds up and exceeds the auxiliary reservoir pressure in the valve chamber 15, the triple valve pistons 14 are moved to release position shown in Fig. 1.

In order to effect an emergency application of the brakes, the brake valve device, not shown, is moved to emergency position, wherein the brake pipe pressure is reduced at an emergency rate. Upon a reduction of brake pipe pressure at an emergency rate, the pressure of the fluid within the piston chamber 48 is reduced at an emergency rate and the differential pressure thus created in chamber 51 is so high as to cause piston 49 to move to its extreme left or emergency position shown in Fig. 3.

Initial movement of the quick service piston 49 toward emergency position causes the valve 64 to be opened by engagement therewith of the stem 70 on the piston 49, and the consequent venting of fluid under pressure from the brake pipe to the quick service bulb 75 in the manner previously described. Final movement of the piston 49 to emergency position causes the bezel ring 111 on the stem 70 to engage and move the valve 84 from its seat and vent fluid from the accelerator chamber 51 to the quick action piston chamber 88 through the passage 87 and thence to the atmosphere through the restricted port 113 in the quick action piston 90, chamber 92 and atmospheric passage 93.

With the valve 84 open, fluid under pressure flows from the accelerator chamber 51 through passage 87 into the quick action piston chamber 88, and the higher fluid pressure acting on the left face of the quick action piston 90 forces the piston to the right against the action of the spring 99 and causes the quick action valve 94 to move to open position and permit fluid under pressure to flow from the brake pipe to the atmosphere through pipe 52, quick action valve chamber 98, past the open quick action valve 94, chamber 92 and atmospheric passage 93, thereby locally venting fluid under pressure from the brake pipe at an emergency rate so as to propagate similar local brake pipe pressure reductions serially throughout the length of the brake pipe and to serially effect emergency application of the brakes throughout the length of the train.

The local reduction in brake pipe pressure at an emergency rate also causes the higher accelerator chamber pressure acting on the check valve 54 to move it to open position against the action of the spring 55 and permit fluid to flow from the accelerator chamber 51 to the brake pipe through the passage 53 and restricted passage 56 as previously mentioned in connection with the stabilizing function of passage 56.

The combined flow of fluid through passages 56 and 87 causes reduction of fluid pressure in the accelerator chamber 51 and the piston chamber 12 at an emergency rate. The higher auxiliary reservoir pressure acting on the right face of the piston 14, causes movement thereof and the main slide valve to emergency position wherein the stop spring 25 is compressed and the emergency port 112 registers with the passage 109. With the main valve 17 in emergency position, fluid under pressure flows from the auxiliary reservoir 7 to the brake cylinder 8 through pipe and passage 107, valve chamber 15, emergency port 112 in the main slide valve 17, and passage and pipe 109.

With the accelerator piston 49 in emergency position, as shown in Fig. 3, the valve 84 is held open and fluid under pressure will continue to flow from the accelerator chamber 51 to the atmosphere through passage 109, chamber 79, past the open valve 84, passage 87, quick action piston chamber 88, port 113 in the quick action piston 90, chamber 92 and atmospheric passage 93, until the fluid pressure in the accelerator chamber 51 is reduced sufficiently to permit the spring 99 to move the vent valve 94 to closed position, thereby cutting off communication from the brake pipe 6 to the atmosphere. When the fluid pressure within the chamber 51 is reduced sufficiently below the fluid pressure in piston chamber 48, the spring 71 forces the quick service valve 64 to closed position and moves the piston 49 to the release position shown in Fig. 1 wherein the valve 84 is seated and the further flow of fluid from the accelerator chamber 51 through the passage 87, is prevented. The check valve spring 55 also closes the check valve 54 and prevents further flow of fluid from the quick service chamber through the passage 56. The piston 49 will remain in release position until the system is recharged. When the brake pipe is recharged and when the pressure in the piston chamber 12 exceeds that in the valve chamber 15 and auxiliary reservoir 7, the triple valve piston 14 will be forced to the release position in the manner previously described.

In Fig. 4, a modified accelerator valve device construction is disclosed wherein the restricted passage 56 of the check valve device 54 is controlled by the piston 49. It will be observed, that the piston 49 laps the passage 56 when the piston is in release position and when in its extreme right position wherein the piston engages the sealing gasket 47, and that the check valve 30 prevents the flow of fluid from the accelerator chamber 51 to the piston chamber 48 through passages 59 and 61. Therefore, upon initial reduction in brake pipe pressure at a service rate, no reduction of pressure in the accelerator chamber can occur due to the escape of fluid under pressure therefrom until the restricted passage 56 is uncovered by the piston 49 and sufficient pressure differential is obtained on opposite sides of the check valve 54 to force the valve 54 to open position.

This arrangement is of advantage in the event that the piston 49 becomes stuck or in the event that there is high frictional resistance to movement of the piston, for then a relatively high pressure differential may be developed on opposite sides of the piston, amply sufficient to overcome the forces holding the piston and thus insure movement of the piston to service position upon a reduction of brake pipe pressure at a service rate.

Movement of the piston 49 to the left uncovers the passage 56 at the time the valve 64 is opened and the higher fluid pressure acting on the under face of the check valve 54 forces it open to permit fluid to flow from the chamber 51 at a service rate and at the same time to prevent the build up of a pressure differential on opposite faces of the piston sufficient to cause movement of the piston 49 past service position to emergency position.

Other fluid pressure brake equipments, operating on principles similar to those described herein, are disclosed and claimed in my Patent 1,976,876 and copending application, Serial No. 677,435, patent and application being filed on the same day as is this application, and assigned to the assignee of this application.

While but two embodiments of the invention are disclosed herein, it is obvious that additions, omissions and other changes may be made in the construction without departing from the spirit of the invention.

Having now described my invention, what I claim as new and desire to secure by Letters Patent, is:

1. In a fluid pressure brake, the combination with a brake pipe, a chamber and a fluid pressure actuated brake controlling valve device operated in response to a reduction in pressure in said chamber for effecting an application of the brakes, of an accelerator valve device comprising a valve for controlling a communication through which fluid is locally vented from said brake pipe, a valve for controlling a communication through which fluid is vented from said chamber, a valve means actuated by fluid vented from said chamber for locally venting fluid from said brake pipe, and means operated upon a reduction in brake pipe pressure to open said valves for effecting local venting of fluid from said brake pipe and venting of fluid from said chamber.

2. In a fluid pressure brake, the combination with a brake pipe, a chamber and a fluid pressure actuated brake controlling valve device operated in response to a reduction in pressure in said chamber for effecting an application of the brakes, of an accelerator valve device comprising a valve for controlling a communication through which fluid is locally vented from said brake pipe, a valve for controlling a communication through which fluid is vented from said chamber a valve means actuated by fluid vented from said chamber for locally venting fluid from said brake pipe, and means operated upon a reduction in brake pipe pressure at a service rate to open the first said valve to effect local venting of fluid from the brake pipe and operated upon a reduction in brake pipe pressure at an emergency rate to open the second said valve to effect reduction in chamber pressure at an emergency rate and to effect operation of said said valve means to effect local venting of fluid from said brake pipe.

3. In a fluid pressure brake, the combination with a brake pipe, a chamber and a fluid pressure actuated brake controlling valve device operated in response to a reduction in pressure in said chamber for effecting an application of the brakes, of an accelerator valve device comprising a valve for controlling a communication through which fluid is locally vented from said brake pipe, a valve for controlling a communication through which fluid is vented from said chamber, a valve responsive to variations in brake pipe pressure for controlling a communication through which fluid is vented from the chamber and adapted to open for effecting venting of fluid from said chamber in response to a reduction in brake pipe pressure at a rate faster than service rate, a valve means actuated by fluid vented from said chamber for locally venting fluid from said brake pipe, and means operated upon a reduction in brake pipe pressure at a service rate to open the first said valve to effect local venting of fluid from the brake pipe and operated upon a reduction in brake pipe pressure at an emergency rate to open the second said valve to effect reduction in chamber pressure at an emergency rate and to effect operation of said valve means to effect local venting of fluid from said brake pipe.

4. In a fluid pressure brake, the combination with a brake pipe, a chamber and a fluid pressure actuated brake controlling valve device operated in response to a reduction in pressure in said chamber for effecting an application of the brakes, of an accelerator valve device comprising a valve for controlling a communication through which fluid is locally vented from said brake pipe, a valve for controlling a communication through which fluid is vented from said chamber, a valve responsive to variations in brake pipe pressure for controlling a communication through which fluid is vented from the chamber to said brake pipe and adapted to open for effecting venting of fluid from said chamber in response to a reduction in brake pipe pressure at a rate faster than service rate, a valve means actuated by fluid vented from said chamber for locally venting fluid from said brake pipe, and means operated upon a reduction in brake pipe pressure at a service rate to open the first said valve to effect local venting of fluid from the brake pipe and operated upon a reduction in brake pipe pressure at an emergency rate to open the second said valve to effect reduction in chamber pressure at an emergency rate and to effect operation of said valve means to effect local venting of fluid from said brake pipe.

5. In a fluid pressure brake, the combination with a brake pipe, a chamber and a fluid pressure actuated brake controlling valve device operated in response to a reduction in pressure in said chamber for effecting an application of the brakes, of an accelerator valve device comprising a valve for controlling a communication through which fluid is locally vented from said brake pipe, a valve for controlling a communication through which fluid is vented from said chamber, a valve responsive to variations in brake pipe pressure for controlling a communication through which fluid is vented from the chamber and adapted to open for effecting venting of fluid from said chamber in response to a reduction in brake pipe pressure at a rate faster than service rate, a valve means actuated by fluid vented from said chamber through the communication controlled by the second said valve for locally venting fluid from said brake pipe, and means operated upon a reduction in brake pipe pressure at a service rate to open the first said valve to effect local venting of fluid from the brake pipe and operated upon a reduction in brake pipe pressure at an emergency rate to open the second said valve to effect reduction in chamber pressure at an emergency rate and to effect operation of said valve means to effect local venting of fluid from said brake pipe.

6. In a fluid pressure brake, the combination with a brake pipe, a chamber and a fluid pressure actuated brake controlling valve device operated in response to a reduction in pressure in said chamber for effecting an application of the brakes, of an accelerator valve device comprising a valve for controlling a communication through which fluid is locally vented from said brake pipe, a valve for controlling a communication through which fluid is vented from said chamber, a valve means actuated by fluid vented from said chamber for locally venting fluid from said brake pipe, and a movable abutment subject on one side to brake pipe pressure and on the other side to pressure in said chamber and operated upon a reduction in brake pipe pressure to open said valves for effecting local venting of fluid from said brake pipe and venting of fluid from said chamber.

7. In a fluid pressure brake, the combination with a brake pipe, a chamber and a fluid pressure actuated brake controlling valve device operated in response to a reduction in pressure in said chamber for effecting an application of the brakes, of an accelerator valve device comprising a valve for controlling a communication through which fluid is locally vented from said brake pipe, a valve for controlling a communication through which fluid is vented from said chamber, a valve responsive to variations in brake pipe pressure for controlling a communication through which fluid is vented from the chamber and adapted to open for effecting venting of fluid from said chamber in response to a reduction in brake pipe pressure at a rate faster than service rate, a valve means actuated by fluid vented from said chamber for locally venting fluid from said brake pipe, and a movable abutment controlling the communication controlled by said pressure responsive valve and subject on one side to brake pipe pressure and on the other side to pressure in said chamber and operated upon a reduction in brake pipe pressure to open said valves and the last said communication for effecting local venting of fluid from said brake pipe and venting of fluid from said chamber.

8. In a fluid pressure brake, the combination with a brake pipe, a chamber, a volume reservoir and a fluid pressure actuated brake controlling valve device operated in response to a reduction in pressure in said chamber for effecting an application of the brakes, of an accelerator valve device comprising a valve for controlling a communication through which fluid is locally vented from said brake pipe to said volume reservoir, a valve for controlling a communication through which fluid is vented from said chamber, a valve means actuated by fluid vented from said chamber for locally venting fluid from said brake pipe, and means operated upon a reduction in brake pipe pressure to open said valves for effecting local venting of fluid from said brake pipe and venting of fluid from said chamber.

9. In a fluid pressure brake, the combination with a brake pipe, a chamber, a volume reservoir and a fluid pressure actuated brake controlling valve device operated in response to a reduction in pressure in said chamber for effecting an application of the brakes, of an accelerator valve device comprising a valve for controlling a communication through which fluid is locally vented from said brake pipe to said volume reservoir, a valve for controlling a communication through which fluid is vented from said chamber, a valve means actuated by fluid vented from said chamber for locally venting fluid from said brake pipe, and means operated upon a reduction in brake pipe pressure to successively open said valves in the order recited for first effecting local venting of fluid from said brake pipe and then venting of fluid from said chamber.

10. In a fluid pressure brake, the combination with a brake pipe, a chamber open to said brake pipe through a restricted passage and a fluid pressure actuated brake controlling valve device operated in response to a reduction in pressure in said chamber for effecting an application of the brakes, of an accelerator valve device comprising a valve for controlling a communication through which fluid is locally vented from said brake pipe, a valve for controlling a communication through which fluid is vented from said chamber, a valve means actuated by fluid vented from said chamber for locally venting fluid from said brake pipe to the atmosphere, and means responsive to variations in brake pipe pressure and operated upon a reduction in brake pipe pressure to open said valves for effecting local venting of fluid from said brake pipe and venting of fluid from said chamber.

11. In a fluid pressure brake, the combination with a brake pipe, a chamber, and a fluid pressure actuated brake controlling valve device operated in response to a reduction in pressure in said chamber for effecting an application of the brakes, of an accelerator valve device comprising a valve for controlling a communication through which fluid is locally vented from said brake pipe, a valve means for controlling a communication through which fluid is vented from said chamber, a valve for controlling another communication through which fluid is vented from said chamber, a valve device actuated by fluid vented from said chamber through the communication controlled by said second valve for effecting local venting of fluid from said brake pipe, and a movable abutment controlling the communication controlled by said valve means and operably responsive to variations in brake pipe pressure for effecting the operation of said valves.

12. In a fluid pressure brake, in combination, a brake pipe, a chamber, a brake controlling valve device operative upon a reduction in pressure in said chamber at a sufficient rate to effect an application of the brakes, means providing a communication through which said chamber is charged with fluid under pressure from the brake pipe, means for preventing back flow through said communication, and valve means responsive only upon a reduction in brake pipe pressure at least at a service rate for venting fluid under pressure from said chamber.

13. In a fluid pressure brake, in combination, a brake pipe, a chamber, a brake controlling valve device operative upon a reduction in chamber pressure to effect an application of the brakes, a movable abutment subject on one side to brake pipe pressure and on the other side to chamber pressure, means providing a communication through which fluid under pressure is supplied from the brake pipe to said chamber, means for preventing back flow of fluid under pressure through said communication from said chamber to the brake pipe, a valve operated by the abutment upon a reduction in brake pipe pressure for locally venting fluid under pressure from the brake pipe, and means operatively responsive to a reduction in brake pipe pressure at a service rate for opening a communication through which fluid under pressure is vented from the chamber to effect a reduction of the pressure therein and a consequent operation of the brake controlling valve device to cause an application of the brakes.

14. In a fluid pressure brake, in combination, a brake pipe, a chamber, a brake controlling valve device operative upon a reduction in chamber pressure at a certain rate to effect a service application of the brakes and upon a reduction in chamber pressure at a higher rate to effect an emergency application of the brakes, a movable abutment subject on one side to brake pipe pressure and on the other side to chamber pressure, means providing a communication through which fluid under pressure is supplied from the brake pipe to said chamber, means for preventing back flow of fluid under pressure through said communication from said chamber to the brake pipe, fluid pressure responsive means operative responsive to a reduction in brake pipe pressure at a service rate for opening a communication through which fluid under pressure is vented from the said chamber to reduce the pressure therein at the said certain rate and thereby effect a service application of the brakes, a valve operated by said abutment to vent fluid under pressure from the said chamber through a communication upon a reduction in brake pipe pressure only at an emergency rate, the combined venting of fluid under pressure from the chamber through the last two communications effecting reduction in chamber pressure at the higher rate to effect an emergency application of the brakes, and valve means actuated by fluid under pressure vented from the chamber through the last said communication for locally venting fluid under pressure from the brake pipe.

EARLE S. COOK.